United States Patent Office 2,753,291
Patented July 3, 1956

2,753,291

METHOD FOR PURIFYING STREPTODORNASE-STREPTOKINASE

John H. Mowat, Orangeburg, and George C. Krupka, Nanuet, N. Y., and Stephen Nalesnyk, Park Ridge, N. J., assignors to American Cyanamid Company, New York, N. Y., a corporation of Maine No Drawing. Application April 5, 1954,
Serial No. 421,158

7 Claims. (Cl. 195—66)

This invention relates to an improved method for isolating and purifying enzymes from fermentation media. More particularly, it relates to an improved method for the separation of Streptodornase and Streptokinase from crude fermentation mash by adsorption of the enzymes on a suitable adsorbent medium at an acid pH and subsequent elution at a controlled pH within the alkaline range.

The prior art has encountered many difficulties in attempting to find methods for separating Streptodornase and Streptokinase in a pure form from their fermentation media. Most notable among these is the fact that the enzymes are extremely labile and are therefore easily susceptible to decomposition during the purification process. Thus, all previous atempts to extract both enzymes in a separate state from a common culture medium inevitably resulted in substantial losses or unsatisfactorily incomplete separation. Moreover, and most important, the isolation of Streptodornase as a separate entity in quantities sufficient for commercial use and in substantially Streptokinase-free yields, has not heretofore been accomplished. Finally, the necessity for reliance on costly equipment and expensive reagents has made previous purification processes undesirable and inefficient.

A method has now been discovered which not only enables the purification of Streptodornase from impure aqueous solutions, such as fermentation beers, but also affords the separation of Streptodornase-Streptokinase mixtures in good yields. From a clinical point of view there has been a long-felt need for a process which would make available Streptodornase and Streptokinase as individuals instead of the naturally-occurring mixtures.

Streptodornase and Streptokinase do not act upon the same kind of substrate when used clinically, nor do they accomplish the same therapeutic results. In fact, it has not been established that the enzymatic activity of one in anyway augments the other. On the contrary, each enzyme acts independently, performing its particular functions without reliance upon, or interference with, the other. To illustrate, Streptakinase activity is limited to the activation of human plasminogen to plasmin, the humoral enzyme, which in turn causes the lysis of fibrin clots. Streptodornase on the other hand, is active against purulent exudates, reducing the viscosity of pus, changing coagulum to thin fluid and making drainage or aspiration considerably easier. This activity is attributed to the ability of Streptodornase to break down desoxyribonucleic acid, the viscous agent in pus.

Although it has been recognized that Streptodornase and Streptokinase can be collected on a filter aid material under acid conditions, the removal of these enzymes from such material by slurrying at a strongly alkaline pH has not been attempted. Heretofore, the unanimous presumption has been that exposure to high alkalinities would promptly destroy both enzymes. That relatively little destruction occurs when carefully controlled pH conditions are maintained has been established by the data disclosed in the present invention.

We have now discovered a method which permits the adsorption of Streptodornase and Streptokinase on an adsorbent medium at a strong acid pH, and the selective elution of each enzyme from such medium under alkaline conditions. We have found that by carefully controlling the hydrogen ion concentration of the mixture to at least about 0.003 mol per liter, it is possible not only to manipulate the separation of the enzymes in such a manner as to enable one to obtain Streptodornase, Streptokinase, or mixtures thereof at will, but also to effect substantial destruction of poisonous toxins such as Streptolysin "0," produced during the fermentation process. As to the latter advantage, it is to be noted that the mere adjustment of the fermentation beer to an acid pH of at least about 2.5, preferably 0.5 to 2.5, accomplishes toxin destruction.

In any process involving purification of enzymes produced as a result of bacterial growth, such as the present one, first consideration must be given to the removal of cellular material and other solid organic matter which interfere with the purification process and may affect the recovery of satisfactory yields. Among the microorganisms known to be capable of eliciting the formation of Streptodornase and Streptokinase, the Beta hemolytic streptococci Lancefield Group A, "human" C, and G Strains are particularly prolific producers. At the conclusion of the fermentation process, the cells of these microorganisms are ordinarily separated from the broth in such manner as to insure minimal loss and destruction of the enzymes. The preferred manner of accomplishing such separation successfully is through the use of filter aid materials. Thus, the culture broth may be admixed with a quantity of adsorbent material (the properties and characteristics of which are more fully described hereinbelow) and the hydrogen ion concentration of the entire mixture adjusted to about 7.0 to 11.5, preferably, about 10.0. The mixture is then filtered, the enzymes passing through in the filtrate and the cells adhering to the filter pad. Although this is a highly efficient method for removing objectionable cellular matter from culture broth, other means may be conveniently used as for example, direct filtration or high-speed centrifugation. In any event, total separation of the undesirable solids by some convenient method is a desirable prerequisite to the purification process.

After the cellular and other interfering material has been removed from the fermentation broth, the latter is in condition for further treatment. The object at this stage of the process is, of course, to separate the water soluble Streptodornase and Streptokinase from other water soluble materials, such as salts, amino acids, etc. co-existing in the broth. The preferred way of doing this is to adsorb the enzymes on a suitable adsorbent material (of the type more fully described hereinbelow) at an acid pH. Although it has been customary heretofore to perform such adsorption at an acid pH, no one has attempted to do so under strong acid conditions for fear of destroying the enzymes. We have now discovered that adsorption of Streptodornase and Streptokinase under such strong acid conditions not only materially aids the concentration of higher quantities of enzymes on the adsorbent material, but also, and perhaps more important, materially aids in the removal of undesirable toxic hemolysins. Thus, although a pH range of 3.5 to about 6.0 is suitable for adsorption of Streptodornase and Streptokinase, our preferred range—namely, 0.5 to 2.5 is a superior one in that it facilitates the destruction and removal of toxic hemolysins and promotes the concentration of the enzymes into a unified, easily elutable mass. The peculiar characteristic of Streptodornase and Streptokinase to adhere to solid adsorbent particles under conditions of strong hydrogen ion concentration, enables also their separation from all other water soluble materials present in the broth such as for example, sulfate, chloride, phosphate and carbonate salts; cations such as calcium and magnesium, and various complexes resulting from the decomposition of organic material whose precise structure is not known.

The usually available acids may be used for adjusting the hydrogen ion concentration such as for example, hydrochloric, sulfuric, phosphoric, acetic or toluenesulfonic. After thorough mixing, the slurry is passed through a filter press leaving behind a relatively pure Streptodornase-Streptokinase mixture on the adsorbent.

A mixture of Streptodornase-Streptokinase now having been adsorbed on the filter aid material, one is now in an advantageous position to handle the separation of Streptodornase at will without endangering its removal by the presence of interfering substances. The removal of the enzyme from the filter pad depends in a large degree upon the skillful manipulation of the hydrogen ion concentration of the eluant. In accordance with the preferred method of carrying out the separation of Streptodornase, the enzyme-containing adsorbent is slurried with sufficient alkali-containing water to result in a mixture having a pH of about 10.0 to about 11.5. These pH conditions are entirely favorable to the removal of Streptodornase from the adsorbent, contrary to the belief heretofore expressed that the enzymes are destroyed when exposed to highly alkaline environment. It is important however that the exposure to alkaline media be of limited duration, preferably not more than 24 hours. Thus, having thoroughly mixed the adsorbent with alkaline water, the slurry is passed through a filter press and the Streptodornase-containing filtrate is adjusted to a milder pH range, preferably about 6.0 to 8.0. The resulting solution, containing Streptodornase, is then subjected to the usual lyophilization treatment preparatory for packaging and storage.

In view of the propensity of Streptokinase to solubilize at a pH range moderately lower than Streptodornase—namely, from about above 7.0, as compared to the range of 9.0 to 11.5 for Streptodornase, the above-outlined process may be carried out with further refinement if so desired. This may be done by simply taking advantage of the relative solubilities of Streptodornase and Streptokinase in the alkaline range. Thus, having adsorbed Streptodornase and Streptokinase on an adsorbent at a pH of 0.5 to 2.5, one may subject the enzyme-containing adsorbent to treatment with alkaline water or a mixture of alkali and salt, such as sodium chloride, at a pH range of 7.0 to 9.0. Filtering this slurry results in substantial separation of Streptokinase from Streptodornase, the forming passing through in the filtrate, the Streptodornase remaining on the filter pad. The Streptokinase-exhausted adsorbent may then be re-slurried, this time with water containing sufficient alkali to give a pH of 9.0 to 11.5. In this range, the Streptodornase becomes solubilized. When the slurry is put into a filter press the Streptodornase passes through with the filtrate.

Another modification of our invention comprises the separation of substantially pure, hemolysin-free mixtures of Streptodornase-Streptokinase from the acid adsorbent. Thus, once the enzymes have been concentrated on the adsorbent pad at a pH of 0.5 to 2.5, it is possible to remove both of them at once in their naturally occurring proportions by mixing the adsorbent with water having a pH of about 10.0 to 11.5 and passing the slurry through a filter press. An aqueous slurry of such high alkalinity renders both enzymes soluble and enables their separation in the filtrate. Although a pH range of 10.0 to 11.5 is preferred for this purpose, wider limits may be employed if so desired as for example, 7.0 to 11.5. This range, as indicated above, embraces the solubilities of both Streptodornase and Streptokinase and insures their inclusion in the filtrate.

As still another modification of the present invention one may successfully achieve the separation of Streptodornase and Streptokinase in good yields and in a relatively pure state by first subjecting Streptodornase-Streptokinase mixtures to a preliminary treatment. Streptodornase-Streptokinase mixtures, when obtained by such methods of purification as precipitation with cholesterol, trichloroacetic acid, protamine or alcohol, still contain impurities which interfere with the separation of the enzymes from each other. In fact, such impurities greatly hinder and prevent the desired separation. For example, salts such as phosphates, sulfates, chlorides and carbonates; metallic ions such as calcium, potassium and magnesium; partially degraded proteins; amino acids, and other water-soluble substances have an undesirably impeding effect on the separation process. In addition, it is very likely that the Streptokinase, either alone or in combination with other substances, seriously interferes with disengagement of pure Streptodornase from the adsorbent.

It is for these reasons that Streptodornase-Streptokinase mixtures, when obtained by any of the processes named above, should first be subjected to a preliminary purification process when it is desired to separate one enzyme from the other. This should be done even though the mixture had already been previously purified to some degree, in order to minimize all undesirable interfering substances. This preliminary treatment may be most conveniently accomplished by adjusting a solution of Streptodornase-Streptokinase to a pH of about 5.0 and allowing the mixture to stand for about 1 to 6 hours. If desired, the mixture may be stored at a low temperature, preferably about 0° C. to 10° C., to speed up the precipitation process. At this pH, Streptokinase as well as other substances such as salts, proteins, etc., are relatively insoluble in water. Streptodornase however, is quite soluble at this pH and therefore remains in solution. The precipitate may then be conveniently separated from the Streptodornase solution by some convenient method such as centrifugation, filtration or adsorption on filter-aid material followed by passage through a filter press and Streptokinase recovered therefrom by suitable means.

At this point of the separation process, we have a relatively pure Streptodornase-Streptokinase solution from which the enzymes may be conveniently separated each from the other. However, instead of adsorbing both of these enzymes on a filter aid and subsequently slurrying and eluting each enzyme in two separate steps, our modification comprises such adjustment of pH conditions as to enable the separation of Streptodornase from Streptokinase in a single step. Thus, in accordance with our preferred modification, a volume of the Streptodornase-Streptokinase solution is adjusted to pH 7.0 to 9.0, preferably about 8.0. A suitable buffer, such as disodium monohydrogen phosphate or sodium borate may be added, if desired, to insure complete stability and minimum deviation of pH. A quantity of adsorbent material is now added and the mixture is stirred thoroughly. Since Streptokinase under these pH conditions, is not picked up by the adsorbent material, whereas Streptodornase is adsorbed, advantage may be taken of this phenomenon in that the Streptodornase may be quantitatively adsorbed on the adsorbent material leaving the free Streptokinase in solution. On filtration, the Streptokinase passes through in the solution and may be recovered therefrom. Subsequent washing of the adsorbent with a suitable alkali, such as trisodium phosphate or the like, at pH 9.0 to 11.5, preferably at 11.0 to 11.5, solubilizes the Streptodornase and releases it from the cake.

The material most suitable for use as an adsorbent in the process of this invention is that belonging to the class known as "diatomaceous earths." There are many varieties of this adsorbent material available, varying mostly in their degree of fineness—as for example, "Celite," a diatomaceous earth material manufactured by the Johns-Manville Corp. and marketed in various grades. Hy-flo Super-Cal is another kind of diatomaceous earth adsorbent available from the same manufacturer. "Dicalite," manufactured by the Dicalite Co. is a very finely divided diatomaceous silica, marketed in different grades of fineness and color. It must be kept in mind however, that the adsorbent material which may be used in this process is not intended to be limited to that made in any particular grade of fineness or marketed under any specific trade name. Any inert diatomaceous earth material is suitable, the grade of fineness employed being reflected in the degree of purity of the final product. Other suitable adsorbent materials adaptable to the process of this invention are glass wool, alumina gel, clay, silica gel, alpha-cellulose, and the like.

After separation of the enzymes from the adsorbent, either as a mixture or separately, the pH of the enzyme solution must be reduced to about 3.0 to 9.0 in order to prevent decomposition of the enzymes. Both Streptodornase and Streptokinase, although relatively stable for short periods of time at alkaline pH, will decompose if allowed to remain alkaline for more than 24 hours. For this purpose, any readily available acid may be used such as hydrochloric, acetic, phosphoric, sulfuric and the like.

For controlling the alkalinity of the enzyme mixture, the alkali metal carbonates and hydroxides are most suitable, as for example, potassium hydroxide, sodium hydroxide, potassium carbonate, sodium carbonate, as well as mixtures thereof. The phosphates, such as trisodium phosphate and disodium hydrogen phosphate may also be used.

The precise quantity of diatomaceous earth or other adsorbent material to be used in the present process is not critical and may vary within wide limits depending upon the nature of the material itself and upon the desires of the individual operator. In general however, it may be stated that 1% or less is adequate for proper handling of the mass. Although higher quantities may be used without exerting any untoward effects on the enzymes, they are not desirable since greater volumes of fluid must then be necessarily employed for formation of the slurry resulting in difficulty in handling.

Streptokinase assays in the present invention were carried out according to the method of Christensen, J. Clin. Invest. 28, 163 (1949); Streptodornase assays were performed according to Christensen (ibid) as modified by Hozelhurst, J. Immun. 65, No. 1, 85 (1950). Assays for Streptolysin "0" were those of Bernheimer J. Genl. Physiol. 30 337–353 (1946–47). A unit of Streptokinase may be defined as the amount of Streptokinase which will activate enough plasminogen to give enough plasmin which will cause liquefaction of a standard cloth formed from bovine fibrinogen and thrombin in 10 minutes at 37° C. A unit of Streptodornase may be defined as the amount of Streptodornase that will cause a change of 1.0 in the relative viscosity during a period of 10 minutes at 30° C. of a standard substrate of desoxyribonucleoprotein whose 0.15% solution has a relative viscosity of 4.0 to 5.5.

The examples below will serve to illustrate our invention in greater detail but are not intended to be limitative upon the scope thereof. All parts are by weight unless otherwise indicated.

*Example I*

A sufficient volume of fermentation beer was centrifuged to yield 10 liters of cell-free filtrate which assayed as follows: $9.1 \times 10^6$ units of Streptokinase; $2.6 \times 10^6$ units of Streptodornase; and $2.0 \times 10^6$ units of Streptolysin "0." To this filtrate 10 grams (0.1%) of diatomaceous earth (Celite 507) were added and the pH was adjusted to 0.5 using 10% sulfuric acid. The slurry was passed through a Buechner funnel and the cake was reconstituted at pH 11.0 using 10 N sodium hydroxide. The mixture was filtered. Assay of the filtrate showed the following: $9.7 \times 10^6$ units of Streptokinase; $2.8 \times 10^6$ units of Streptodornase; and $0.09 \times 10^6$ units of Streptolysin "0."

*Example II*

A sufficient quantity of fermentation beer was filtered to yield a 20 liter volume of cell-free filtrate which assayed as follows: $20.8 \times 10^6$ units of Streptokinase; $12.4 \times 10^6$ units of Streptodornase; and $8.8 \times 10^6$ units of Streptolysin "0." The pH of the filtrate was adjusted to 0.7. 20 grams of diatomaceous earth (Celite 507) in the amount of 0.1% were added to the filtrate and a slurry formed. The mixture was filtered through a Buechner funnel and the resulting filter cake was suspended in water and adjusted to pH 11.0 with 10 N sodium hydroxide. The mixture was refiltered and the filtrate assayed. The results were as follows: $16.6 \times 10^6$ units of Streptokinase; $8.8 \times 10^6$ units of Streptodornase; and $1.12 \times 10^6$ units of Streptolysin "0."

*Example III*

A sufficient quantity of fermentation beer was filtered to yield a 20 liter volume of cell-free filtrate which assayed as follows: $20.8 \times 10^6$ units of Streptokinase; $16.4 \times 10^6$ units of Streptodornase; and $3.1 \times 10^6$ units of Streptolysin "0." A 10 gram quantity of diatomaceous earth (Celite 507) was added to the filtrate and the mixture was adjusted to pH 0.4 using 10% sulfuric acid. The mixture was filtered and the filter cake was slurried with water containing sufficient 10 N sodium hydroxide to adjust the pH to 11.0. The mixture was refiltered yielding a filtrate which assayed as follows: $14.4 \times 10^6$ units of Streptokinase; $3.6 \times 10^6$ units of Streptodornase; and $0.14 \times 10^6$ of Streptolysin "0."

*Example IV*

A sufficient quantity of fermentation beer was filtered to yield a 30 liter volume of cell-free filtrate, which assayed as follows: $21.1 \times 10^6$ units of Streptokinase; $31.8 \times 10^6$ units of Streptodornase; and $5.4 \times 10^6$ units of Streptolysin "0." Diatomaceous earth (Celite 507) in the amount of 0.1% was added to the filtrate and the mixture was adjusted to pH 0.95 using 10% sulfuric acid. The mixture was filtered and the filter cake was admixed with water and a sufficient quantity of 10 N sodium hydroxide to obtain a pH of 11.0. The reslurried cake was again filtered yielding a filtrate which assayed as follows: $7.5 \times 10^6$ units of Streptokinase; $14.2 \times 10^6$ units of Streptodornase; and $0.4 \times 10^6$ units of Streptolysin "0."

*Example V*

A sufficient quantity of fermentation beer was filtered to yield a 1 liter volume of cell-free filtrate, which assayed as follows: $0.91 \times 10^6$ units of Streptokinase; $1.5 \times 10^6$ units of Streptodornase. Refined wood flour (Solka Flock) in the amount of 0.1% was added to the filtrate and the mixture adjusted to pH 2.0 using 10% sulfuric acid. The mixture was filtered and the filter cake mixed with a sufficient quantity of water containing 10 N sodium hydroxide to obtain a pH of 11.0. The mixture was filtered again yielding a filtrate which assayed as follows: $1.16 \times 10^6$ units of Streptokinase; $0.57 \times 10^6$ units of Streptodornase.

*Example VI*

A sufficient quantity of fermentation beer was filtered to yield a 1 liter volume of cell-free filtrate which assayed as follows: $0.78 \times 10^6$ units of Streptokinase; $0.47 \times 10^6$ units of Streptodornase. Diatomaceous earth (Filter Cell) in the amount of 0.1% was added to the filtrate and the mixture adjusted to pH 2.0 using 10 sulfuric acid. The slurry was filtered and the filter cake admixed with water containing a sufficient quantity of 10 N sodium hydroxide to obtain pH 11.0. The mixture was again filtered, yielding a filtrate which assayed as follows: $0.71 \times 10^6$ units of Streptokinase; $0.09 \times 10^6$ units of Streptodornase.

*Example VII*

A sufficient quantity of fermentation beer was filtered to yield a 1 liter quantity of cell-free filtrate, which assayed as follows: $0.81 \times 10^6$ units of Streptokinase; $0.33 \times 10^6$ units of Streptodornase. Diatomaceous earth (Hy-flo) in the amount of 0.5% was added to the filtrate and the mixture was adjusted to pH 2.0 using sulfuric acid. The slurry was filtered, the filtrate removed, and the cake eluted with water at pH 11.0, made alkaline with 10 N sodium hydroxide. The eluate assayed as follows: $0.22 \times 10^6$ units of Streptokinase; $0.13 \times 10^6$ units of Streptodornase.

*Example VIII*

Fermentation beers from two runs, each containing about 300 liters of fermented medium, were combined and the pH of the resulting mixture was adjusted to 9.5 with 10 N sodium hydroxide. 18 kg. of diatomaceous earth (Celite 507) was added and the suspension was then filtered by means of a filter press, with 10 frames precoated with diatomaceous earth. The cake was washed with 40 to 50 liters of tap water and the wash was combined with the filtrate. 6 kg. of diatomaceous earth was added to the filtrate and another 3 kg. was used to precoat 4 frames of the filter press. The pH of the suspension was lowered to 3.5 with concentrated hydrochloric acid, stirred for 3 hours, and the entire mixture was then filtered through the press. The cake was washed with 40 liters of tap water and both the filtrate and wash were discarded.

A solution of 400 grams of sodium carbonate in 40 liters of water was adjusted to pH 11.5 by the addition of 10 N sodium hydroxide. This solution was pumped into the press, circulated for a half hour within the press as a slurry with the cake and then pumped through the press. A 40 liter volume of tap water was adjusted to pH 11.5 with 10 N sodium hydroxide, and circulated within the press for 15 minutes before being pumped through. This wash was added to the eluate to yield a combined volume of Streptokinase-Streptodornase solution.

*Example IX*

A 6 liter volume of crude fermentation beer was adjusted to pH 9 with 10 N sodium hydroxide and filtered with the aid of 120 grams of diatomaceous earth (Celite 507), 1 liter of the filtrate was adjusted to pH 3.2 with concentrated hydrochloric acid after addition of 10 grams of diatomaceous earth (Celite 507). The suspension was allowed to stand overnight after which it was filtered and washed. The filter cake was then suspended in 500 ml. of water containing 1 gram of sodium dihydrogen phosphate. A strong solution of sodium pyrophosphate was added drop-wise until the pH reached 7. The mixture was then filtered yielding a Streptokinase-containing filtrate.

The filter cake was resuspended in 500 ml. of water, the pH was adjusted to 11 and the mixture was filtered. The filtrate contained Streptodornase.

*Example X*

A 500-ml. sample of beer was adjusted to pH 10 with 10 N sodium hydroxide solution, stirred with 5 grams of Celite 507, and filtered by vacuum to remove cells. The pH 10 filtrate was stirred several hours with Celite after lowering the pH to 3 with hydrochloric acid and the mixture was again filtered. The filter cake was then suspended in 150 ml. of water at pH 5 and filtered. This operation was repeated on each cake at successively higher pH values. The assay results are tabulated below after correcting for volume differences:

| | Total Streptodornase, Units | Total Streptokinase, Units |
|---|---|---|
| Crude Beer | 450,000 | 442,000 |
| pH 10 Filtrate | 530,000 | 299,000 |
| pH 3 Filtrate | 100,000 | nil |
| pH 5 Filtrate | 32,000 | nil |
| pH 6 Filtrate | 28,000 | nil |
| pH 7 Filtrate | 70,000 | 52,000 |
| pH 8 Filtrate | 68,000 | 145,600 |
| pH 9 Filtrate | 70,000 | 208,000 |
| pH 10 Filtrate | 120,000 | 114,400 |
| pH 11 Filtrate | 242,000 | 46,000 |

*Example XI*

85 grams of lyophilized solids containing Streptokinase-Streptodornase and obtained according to the method of Ablondi and Querry (copending U. S. application S. N. 242,581, filed August 18, 1951) now Patent No. 2,691,620 were dissolved in two and one-half liters of water and centrifuged. To the centrifuged solution 250 grams of Dicalite were added and the mixture was adjusted to pH 3.0, using 10% hydrochloric acid. A total of 125 grams of sodium chloride was dissolved in the mixture which was then filtered leaving the activity as a precipitate on the Dicalite pad. The pad was washed with 400 ml. of 5% aqueous sodium chloride solution and the washed pad was then suspended in three liters of water at pH 8 for one and one-half hours. This suspension was kept overnight at 6° C., stirred an additional half hour and filtered. The filter cake was washed with 400 ml. of distilled water and the wash and filtrate were pooled. The resulting solution was found by assay to contain a total of $92 \times 10^6$ units of Streptodornase.

The volume of the solution was increased to six liters by the addition of distilled water and 400 grams of diatomaceous earth (Celite 507) were added thereto. The pH was then lowered to 5.0 and the mixture was stirred for another half hour and filtered. The filtrate contained Streptodornase free from salts, cellular material and metallic ions and assayed $71 \times 10^6$ units of Streptodornase.

*Example XII*

A total of 573 grams of sodium chloride was dissolved in the solution obtained as described in Example XI and the mixture was adjusted to pH 3.0 with hydrochloric acid. After standing overnight, the mixture was centrifuged and the solids were redissolved in one and one-half liters of water, adjusted to pH 11.3 with sodium hydroxide. A total of 150 grams of salt was dissolved in the solution and the resulting mixture was adjusted to pH 3. After standing overnight, the mixture was centrifuged. The solids were stirred thoroughly in 200 ml. of water and 400 ml. of ethyl alcohol was added thereto. The mixture was stirred for a half hour and then centrifuged. This alcohol-water treatment was repeated and the washed solids were dried by successive alcohol, acetone and anhydrous ethyl ether washes, followed by final drying in the Abderhalden pistol over sodium hydroxide pellets. The dried product assayed $73 \times 10^6$ units of Streptodornase.

A total of 250 mgm. of the above material was dissolved in 100 ml. of water at pH 11.0 to 11.5 and the resulting solution was adjusted to pH 8.0 with hydrochloric acid. About 0.5 ml. of pH 8 phosphate buffer was added thereto and the total volume was made up to 125 ml. with water. A 10 ml. sample was removed for assay and the remaining 115 ml. was stirred for two and one-half hours with 5 grams of diatomaceous earth (Celite 507). The mixture was filtered and the filter cake was washed with water adjusted to pH 8.0. The 115 ml. solution assayed $1.4 \times 10^6$ units of Streptodornase; the combined filtrate and wash assayed $0.1 \times 10^6$ units of Streptokinase.

Example XIII

A dried powder representing partially purified Streptokinase and Streptodornase was prepared as follows: A crude beer was processed according to the filtration techniques described in Examples VIII and IX above. The material so obtained was then further purified by treatment with protamine as described in copending U. S. application, S. N. 240,296, filed August 3, 1951, now Patent No. 2,677,642, by Ablondi and Nalesnyk. The product of this process was then lyophilized to yield a dry powder.

Approximately 50 mg. of this powder was dissolved in 100 ml. of water at pH 10.5 to 11.0 and the pH was then adjusted to about 8. To this solution 5 ml. of 0.5 M phosphate buffer at pH 8.0 and 95 ml. of water were added. The pH was adjusted to exactly 8.0 and the volume to 200 ml. To this solution 2 grams of diatomaceous earth (Celite 507) were added and the mixture was stirred gently for three-quarters of an hour after which time the mixture was filtered. The filtrate was assayed.

The diatomaceous earth filter cake was washed with 10 ml. of water at pH 8.0 (containing phosphate buffer) and the wash was discarded.

The washed cake was then stirred with 150 ml. of water containing 250 mg. of trisodium phosphate (pH 11.3) for 10 to 15 minutes, after which time the mixture was filtered and the cake was washed with an additional 50 ml. of the same eluant. The combined eluate and washing were adjusted to pH 8.5 before assaying. The results were as follows:

|  | Units per ml. ||
|---|---|---|
|  | Streptokinase | Streptodornase |
| pH 8 Filtrate | 2,214 | 1,800 |
| pH 11.3 Filtrate+Wash | 0 | 1,580 |

Example XIV

Approximately 50 mg. of powder (obtained according to the technique set forth in Example XIII, paragraph I) was dissolved in 100 ml. of water at pH 10.5 to 11 and the pH was then adjusted to about 8. To this solution, 1 ml. of 0.5 M phosphate buffer at pH 8.0 and 95 ml. of water were added. The pH was adjusted to exactly 8.0 with sodium hydroxide and the volume to 200 ml. To this solution 2 grams of diatomaceous earth (Celite 507) were added and the mixture was stirred gently for one and one-quarter hours at which time the mixture was filtered. The filtrate was assayed.

The diatomaceous earth filter cake was washed with 10 ml. of water at pH 8.0 (containing phosphate buffer) and the wash was discarded.

The washed cake was then stirred with 150 ml. of water containing 250 mg. of trisodium phosphate (pH 11.3) for 10 to 15 minutes, after which time the mixture was filtered and the cake was washed with an additional 50 ml. of the same eluant. The combined eluate and washing were adjusted to pH 8.5 before assaying. The results were as follows:

|  | Units per ml. ||
|---|---|---|
|  | Streptokinase | Streptodornase |
| pH 8 Filtrate | 1,560 | 0 |
| pH 11.3 Filtrate | 0 | 3,750 |

Example XV

Approximately 100 mg. of powder (obtained according to the technique set forth in Example XIII, paragraph I, was dissolved in a volume of water sufficient to make 100 ml. at pH 10.5 to 11.0 and the pH was then adjusted to about 8. To this solution 0.5 ml. of 0.5 M phosphate buffer at pH 8.0 and 95 ml. of water were added. The pH was adjusted to exactly 8.0 with sodium hydroxide and the volume to 200 ml. of water. To this solution 2.5 grams of diatomaceous earth (Celite 507) were added and the mixture was stirred gently for three-quarters hour, after which time the mixture was filtered and brought to 150-ml. volume before assaying.

The diatomaceous earth filter cake was washed with 10 ml. of water at pH 8 (phosphate buffer added) and the wash was discarded.

The washed cake was then eluted with 50 to 60 ml. of water at about pH 11.0 to 11.3, containing about 1 mg. per ml. of trisodium phosphate. The elution was repeated once with the same volume of water containing the same quantity of trisodium phosphate. The eluates were combined and diluted to 150 ml. volume before assaying. The results were as follows:

|  | Units per ml. ||
|---|---|---|
|  | Streptokinase | Streptodornase |
| pH 8 Filtrate | 4,160 | 550 |
| pH 11.3 Filtrate | 0 | 2,350 |

Example XVI

Approximately 100 mg. of powder (obtained according to the technique set forth in Example XIII, paragraph I, was dissolved in a volume of water sufficient to make 100 ml. at pH 10.5 to 11.0 and the pH was then adjusted to about 8. To this solution 0.5 ml. of 0.5 M phosphate buffer at pH 8.0 and 95 ml. of water were added. The pH was adjusted to exactly 8.0 with sodium hydroxide and the volume to 200 ml. of water. To this solution 2.5 grams of diatomaceous earth (Celite 507) were added and the mixture was stirred gently for three-quarters hour, after which time the mixture was filtered and brought to 150-ml. volume before assaying.

The diatomaceous earth filter cake was washed with 10 ml. of water at pH 8 (phosphate buffer added) and the wash was discarded.

The washed cake was then stirred in about 70 ml. of 0.5% trisodium phosphate solution containing 0.5% sodium chloride (pH 11.4) for 20 to 25 minutes. The mixture was filtered and the filter cake was washed on the filter with repeated small portions of fresh trisodium phosphate—sodium chloride solution. The final combined eluate was adjusted to 160 ml. and to pH 8.0 before assaying. The results were as follows:

|  | Units per ml. ||
|---|---|---|
|  | Streptokinase | Streptodornase |
| pH 8.0 Filtrate | 4,420 | 1,260 |
| pH 11.4 Filtrate | 0 | 6,900 |

We claim:

1. A method for recovering Streptodornase from substantially pure aqueous solutions containing the same, which comprises adjusting cell-free, Streptodornase-containing aqueous solutions to a pH of about 0.5 to about 2.5, admixing a quantity of adsorbent material therewith adjusting the pH of said solution to not less than 6.0 and not more than 9.0 so as to absorb the Streptodornase thereon, recovering the adsorbent from the solution, treating said adsorbent with sufficient alkali-containing water to bring the mixture to a pH of about 9.0 to 11.5, filtering said mixture and recovering Streptodornase from the filtrate.

2. A method for recovering and purifying mixtures of Streptodornase-Streptokinase from aqueous solutions containing the same, which comprises adjusting cell-free, Streptodornase-Streptokinase-containing aqueous solutions to a pH of about 0.5 to about 2.5, admixing a quantity of adsorbent material therewith, recovering the adsorbent from the solution, treating said adsorbent with a sufficient quantity of alkaline solution to produce a mixture having a pH of about 9.0 to about 11.5, filtering said mixture and recovering Streptodornase-Streptokinase from the filtrate.

3. A method for recovering mixtures of Streptodornase-Streptokinase and separating each from the other, which comprises adjusting cell-free Streptodornase-Streptokinase-containing fermentation beer to a pH of about 0.5 to about 2.5, admixing a quantity of adsorbent material therewith, recovering the adsorbent from the beer, treating said adsorbent with a sufficient quantity of alkaline solution to produce a mixture having a pH of about 7.0 to about 9.0, filtering said mixture, admixing the substantially Streptokinase-free adsorbent with sufficient alkali-containing water to bring the mixture to a pH of about 9.0 to 11.5, filtering said mixture and recovering Streptodornase from the filtrate.

4. A method for separating Streptodornase from Streptokinase which comprises admixing a quantity of adsorbent material with a volume of substantially pure solution of Streptodornase-Streptokinase, adjusting the pH of said solution to not less than 6.0 and not more than 9.0, so as to adsorb the Streptodornase on the adsorbent filtering to remove the unadsorbed Streptokinase, eluting the adsorbent with an alkaline solution at a pH of about 9.0 to 11.5, and recovering Streptodornase from the eluate.

5. A method as set forth in claim 4, wherein the Streptodornase-Streptokinase solution is one which has been preliminarily subjected to treatment with acid at pH 5.0.

6. A method as set forth in claim 4, wherein the pH of the mixture is adjusted to 8.0 with a phosphate buffer.

7. In a method for purifying mixtures of Streptodornase-Streptokinase, the step which comprises adjusting Streptodornase-Streptokinase-containing mixtures to a pH of not more than about 2.5.

References Cited in the file of this patent
UNITED STATES PATENTS

| | | |
|---|---|---|
| 2,666,729 | Baumgarten | Jan. 19, 1954 |
| 2,677,642 | Ablondi | May 4, 1954 |
| 2,691,620 | Ablondi | Oct. 12, 1954 |